(12) United States Patent
Wang et al.

(10) Patent No.: US 11,748,540 B2
(45) Date of Patent: Sep. 5, 2023

(54) METHOD AND STRUCTURE FOR MANDREL AND SPACER PATTERNING

(71) Applicant: Taiwan Semiconductor Manufacturing Company, Ltd., Hsin-Chu (TW)

(72) Inventors: Chung-Ming Wang, Chiayi (TW); Chih-Hsiung Peng, Miaoli County (TW); Chi-Kang Chang, New Taipei (TW); Kuei-Shun Chen, Hsinchu (TW); Shih-Chi Fu, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 53 days.

(21) Appl. No.: 17/229,736

(22) Filed: Apr. 13, 2021

(65) Prior Publication Data

US 2021/0232747 A1    Jul. 29, 2021

Related U.S. Application Data

(60) Continuation of application No. 16/725,082, filed on Dec. 23, 2019, now Pat. No. 11,010,526, which is a
(Continued)

(51) Int. Cl.
*G06F 30/39* (2020.01)
*G06F 30/398* (2020.01)
(Continued)

(52) U.S. Cl.
CPC ...... *G06F 30/39* (2020.01); *H01L 21/823431* (2013.01); *H01L 27/0207* (2013.01);
(Continued)

(58) Field of Classification Search
USPC ........................................................ 716/119
See application file for complete search history.

(56) References Cited

U.S. PATENT DOCUMENTS

| 8,039,179 B2 | 10/2011 | Shieh et al. |
| 8,202,681 B2 | 6/2012 | Lin et al. |
| (Continued) | | |

FOREIGN PATENT DOCUMENTS

| CN | 104517005 | 4/2015 |
| JP | 2000112114 | 4/2000 |
| (Continued) | | |

OTHER PUBLICATIONS

U.S. Appl. No. 14/191,789, filed Feb. 27, 2014, by inventor Jhon Jhy Liaw for "Structure and Method for FinFET SRAM," 28 pages of text, 29 pages of drawings.
(Continued)

*Primary Examiner* — Bryce M Aisaka
(74) *Attorney, Agent, or Firm* — Haynes and Boone, LLP

(57) ABSTRACT

A method includes forming a first mandrel pattern and a second mandrel pattern. The first mandrel pattern includes at least first and second mandrels for a mandrel-spacer double patterning process. The second mandrel pattern includes at least a third mandrel inserted between the first and second mandrels. The first mandrel pattern and the second mandrel pattern include a same material. The first and second mandrels are merged together with the third mandrel to form a single pattern.

20 Claims, 16 Drawing Sheets

Related U.S. Application Data continuation of application No. 15/945,356, filed on Apr. 4, 2018, now Pat. No. 10,521,541, which is a division of application No. 14/801,383, filed on Jul. 16, 2015, now Pat. No. 9,946,827.

(51) Int. Cl.
*H01L 27/088* (2006.01)
*H01L 29/06* (2006.01)
*H01L 21/8234* (2006.01)
*H01L 27/02* (2006.01)
*G06F 111/20* (2020.01)

(52) U.S. Cl.
CPC ...... *H01L 27/0886* (2013.01); *H01L 29/0653* (2013.01); *G06F 30/398* (2020.01); *G06F 2111/20* (2020.01)

(56) References Cited

U.S. PATENT DOCUMENTS

| | | |
|---|---|---|
| 8,527,916 B1 | 9/2013 | Chiang et al. |
| 8,572,520 B2 | 10/2013 | Chou et al. |
| 8,589,828 B2 | 11/2013 | Lee et al. |
| 8,589,830 B2 | 11/2013 | Chang et al. |
| 8,627,241 B2 | 1/2014 | Wang et al. |
| 8,631,360 B2 | 1/2014 | Wang et al. |
| 8,631,361 B2 | 1/2014 | Feng |
| 8,728,332 B2 | 5/2014 | Lin et al. |
| 8,732,626 B2 | 5/2014 | Liu et al. |
| 8,739,080 B1 | 5/2014 | Tsai et al. |
| 8,745,550 B2 | 6/2014 | Cheng et al. |
| 8,751,976 B2 | 6/2014 | Tsai et al. |
| 8,762,900 B2 | 6/2014 | Shin et al. |
| 8,812,999 B2 | 8/2014 | Liu et al. |
| 8,822,243 B2 | 9/2014 | Yan et al. |
| 8,850,366 B2 | 9/2014 | Liu et al. |
| 2006/0014338 A1 | 1/2006 | Doris et al. |
| 2006/0091468 A1 | 5/2006 | Liaw |
| 2008/0188080 A1 | 8/2008 | Furukawa et al. |
| 2011/0281208 A1 | 11/2011 | Lin et al. |
| 2012/0137261 A1* | 5/2012 | Ban .................. G06F 30/39 716/52 |
| 2012/0139101 A1 | 6/2012 | Shimada et al. |
| 2012/0278776 A1 | 11/2012 | Lei et al. |
| 2013/0267047 A1 | 10/2013 | Shih et al. |
| 2013/0295769 A1 | 11/2013 | Lin et al. |
| 2013/0309838 A1 | 11/2013 | Wei et al. |
| 2014/0101624 A1 | 4/2014 | Wu et al. |
| 2014/0109026 A1 | 4/2014 | Wang et al. |
| 2014/0120459 A1 | 5/2014 | Liu et al. |
| 2014/0017556 A1 | 6/2014 | Colinge et al. |
| 2014/0193974 A1 | 7/2014 | Lee et al. |
| 2014/0215421 A1 | 7/2014 | Chen et al. |
| 2014/0242794 A1 | 8/2014 | Lin et al. |
| 2014/0248773 A1 | 9/2014 | Tsai |
| 2014/0264760 A1 | 9/2014 | Chang et al. |
| 2014/0264899 A1 | 9/2014 | Chang et al. |
| 2014/0273442 A1 | 9/2014 | Liu et al. |
| 2014/0273446 A1 | 9/2014 | Huang et al. |
| 2014/0282334 A1 | 9/2014 | Hu et al. |
| 2014/0320451 A1 | 10/2014 | Lee et al. |
| 2015/0060959 A1 | 3/2015 | Lin et al. |
| 2017/0017745 A1 | 1/2017 | Wang et al. |

FOREIGN PATENT DOCUMENTS

| | | |
|---|---|---|
| KR | 19960023656 | 6/1996 |
| KR | 20060131621 | 12/2006 |
| KR | 20080055213 | 6/2008 |
| TW | 201520799 | 6/2015 |

OTHER PUBLICATIONS

Notice of Allowance of Patent dated Aug. 21, 2017, Application No. KR10-2015-0145556, 6 pages.

* cited by examiner

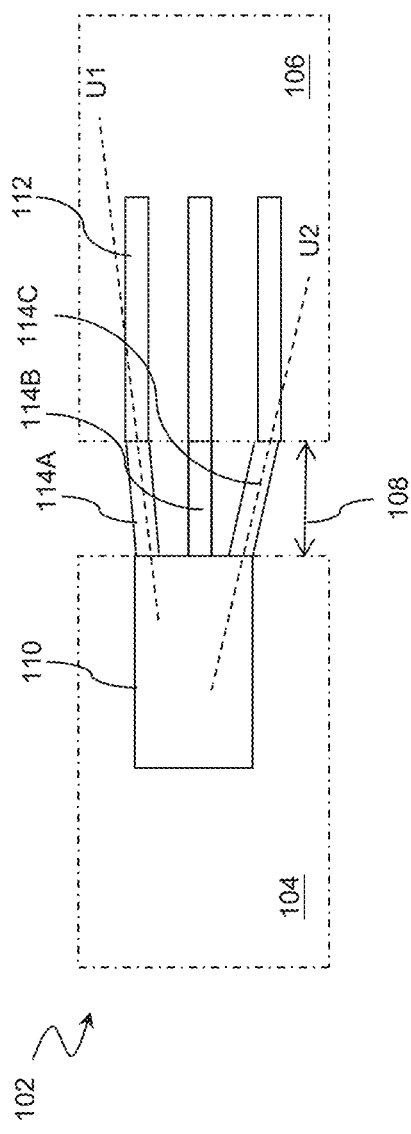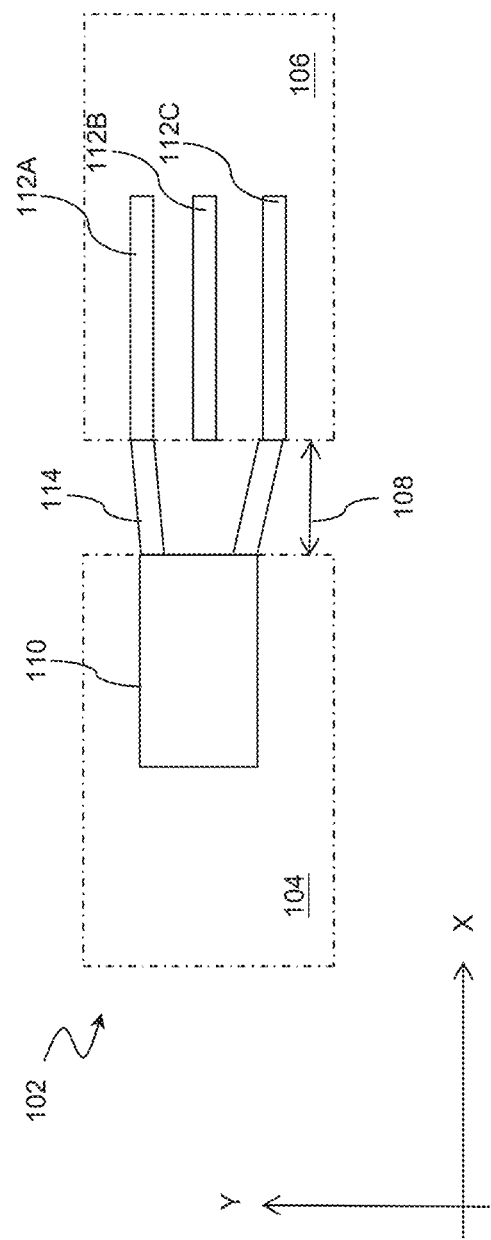

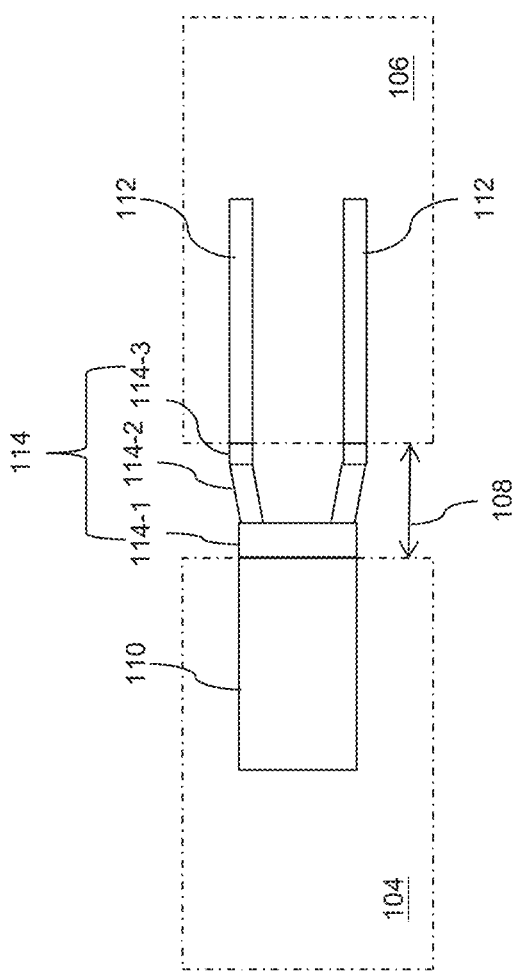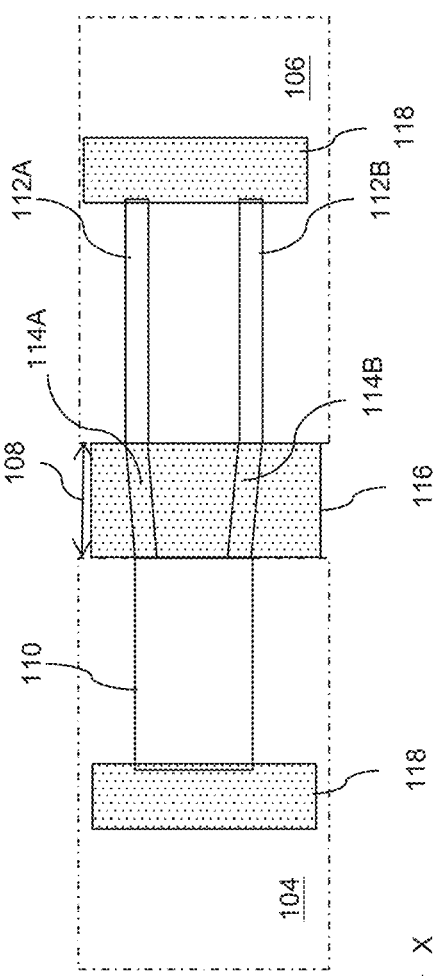

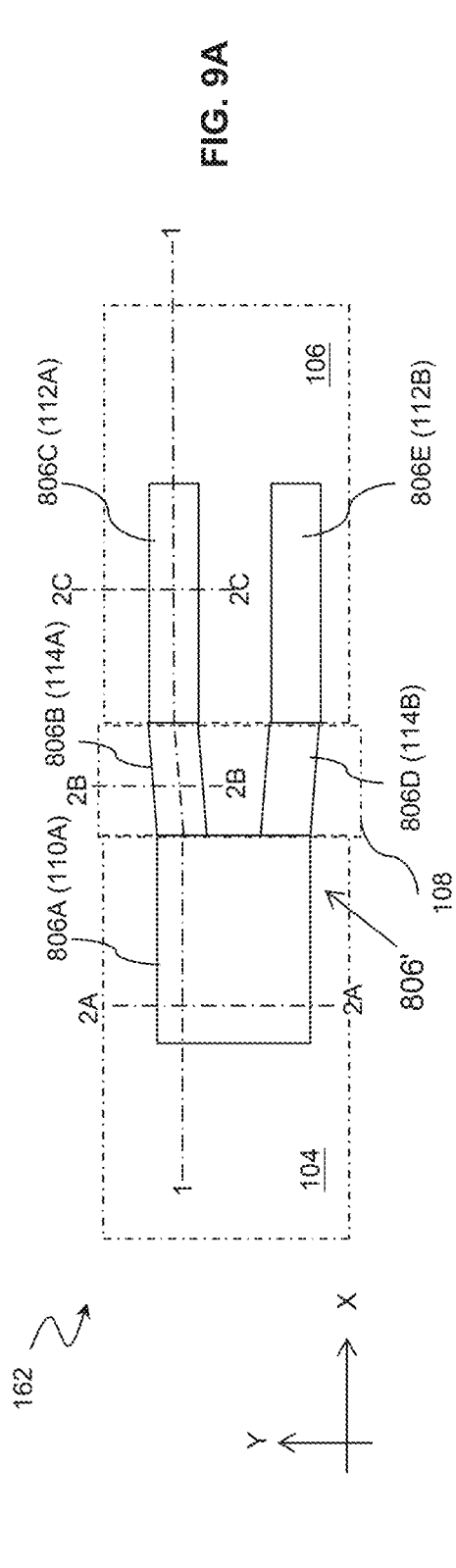
FIG. 9A
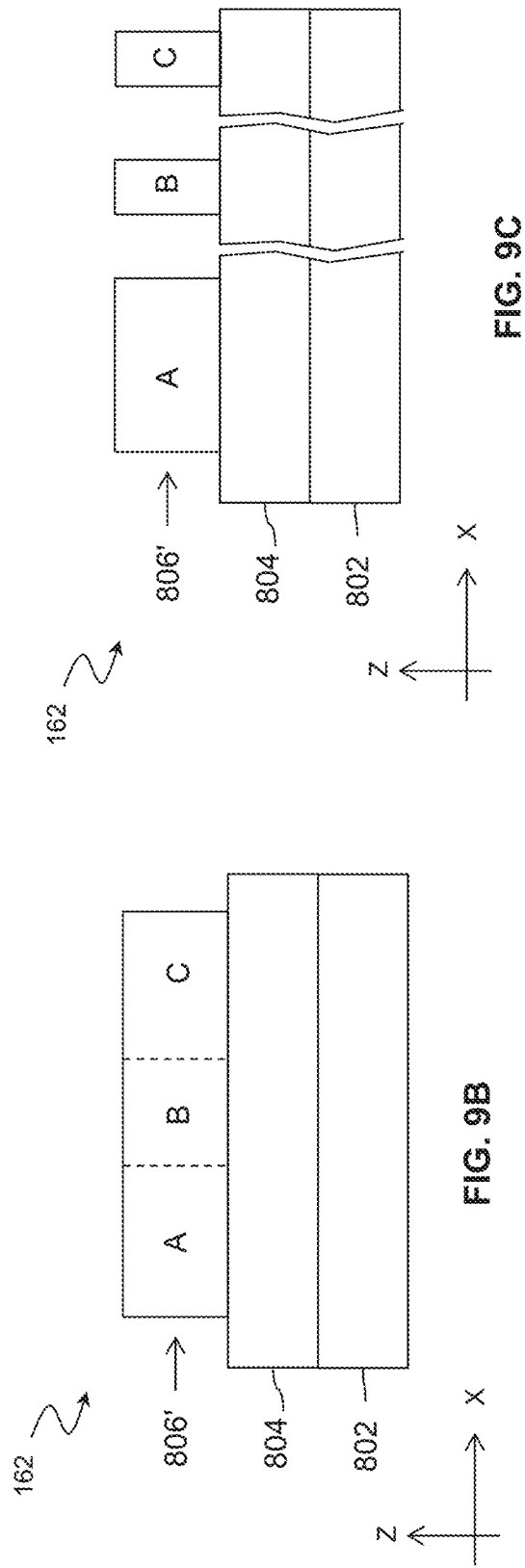
FIG. 9C
FIG. 9B

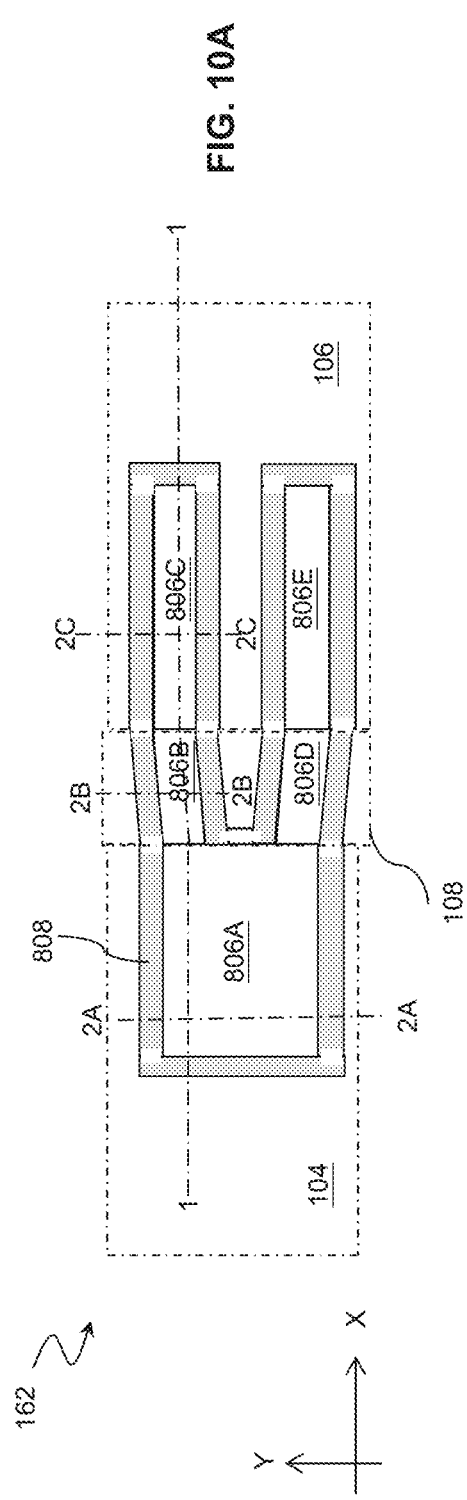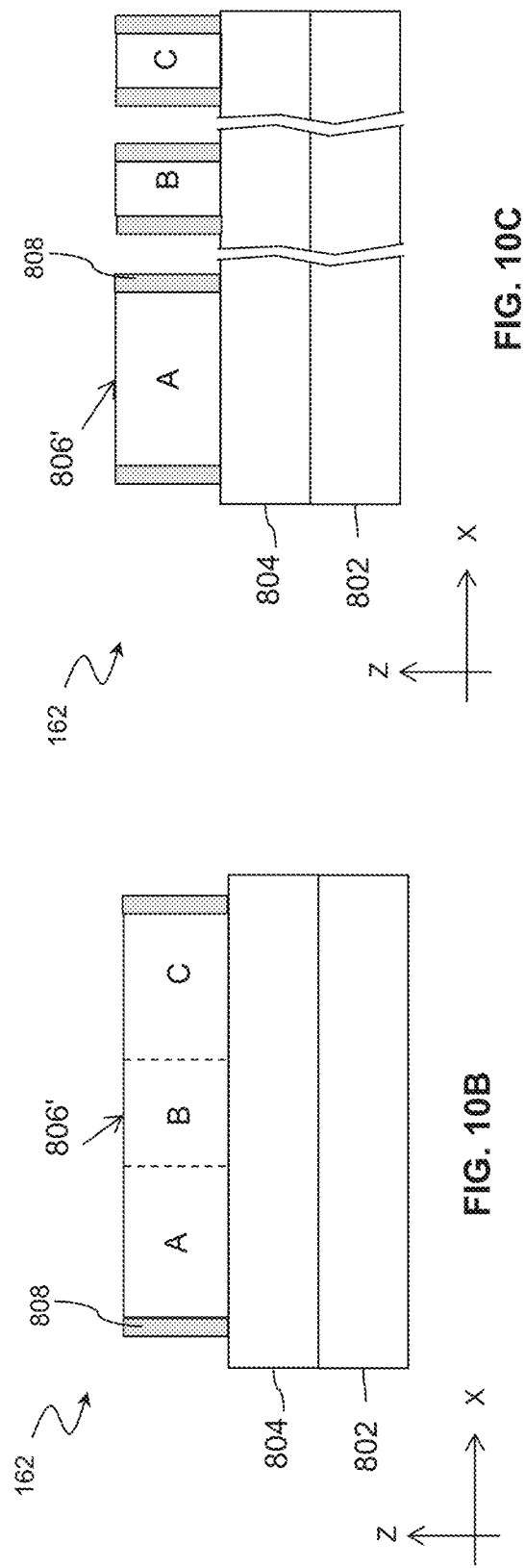

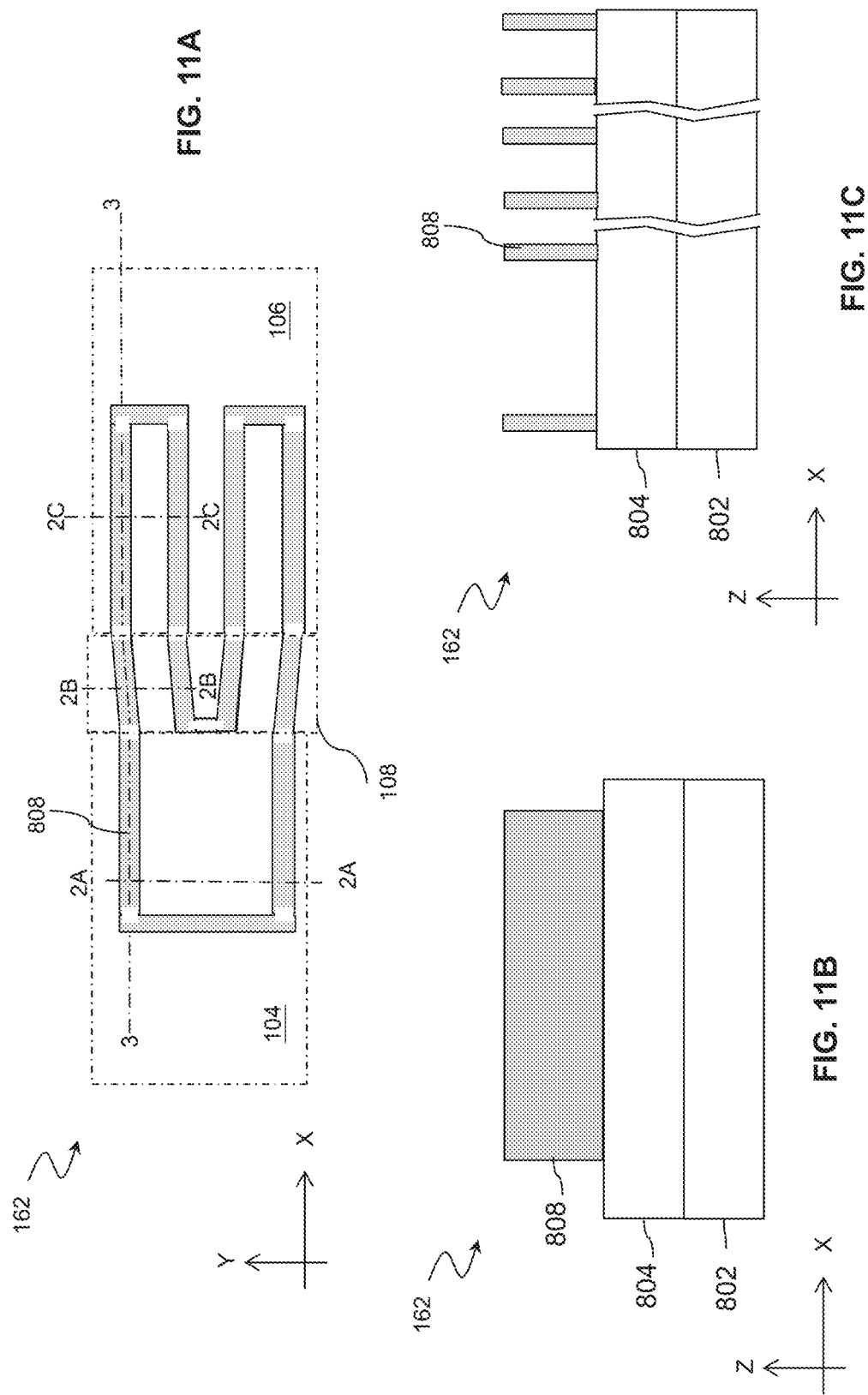

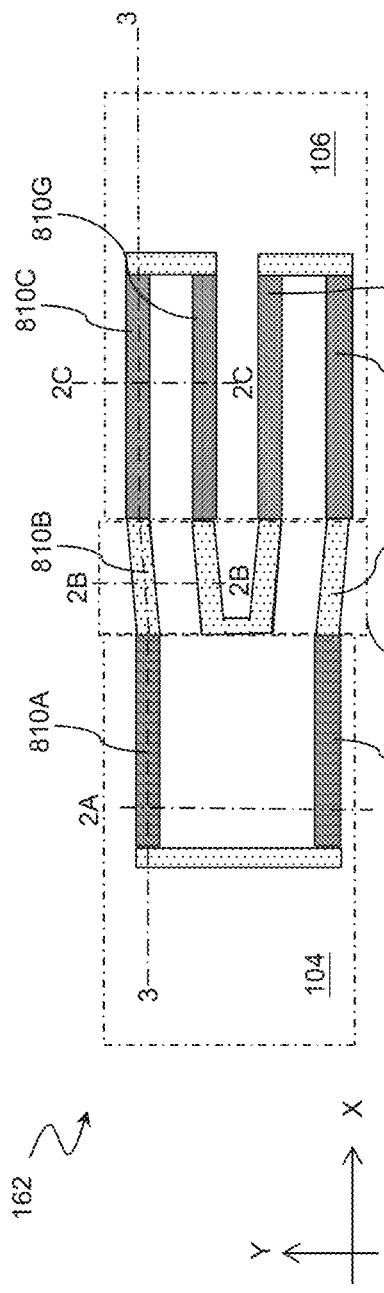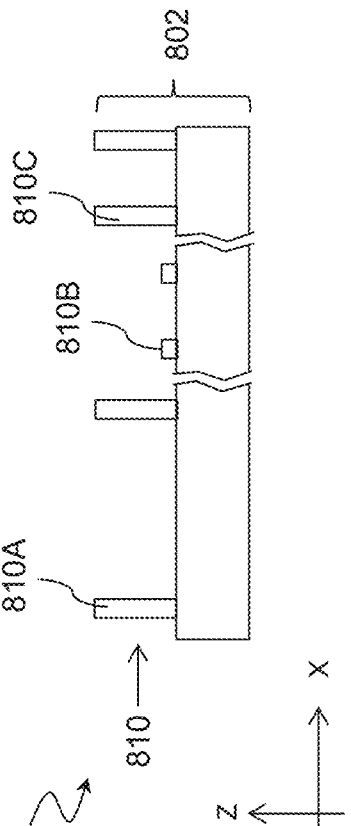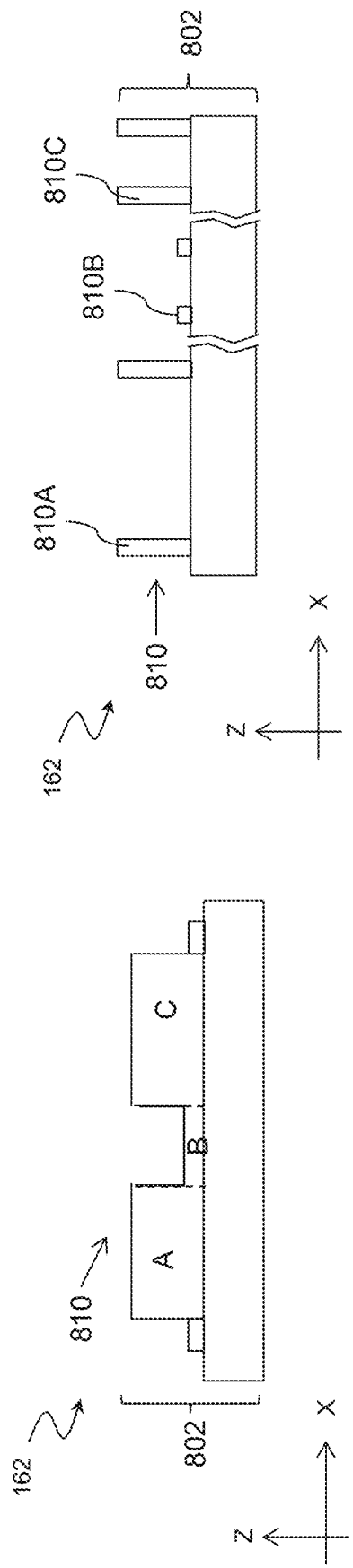
FIG. 13A
FIG. 13B
FIG. 13C

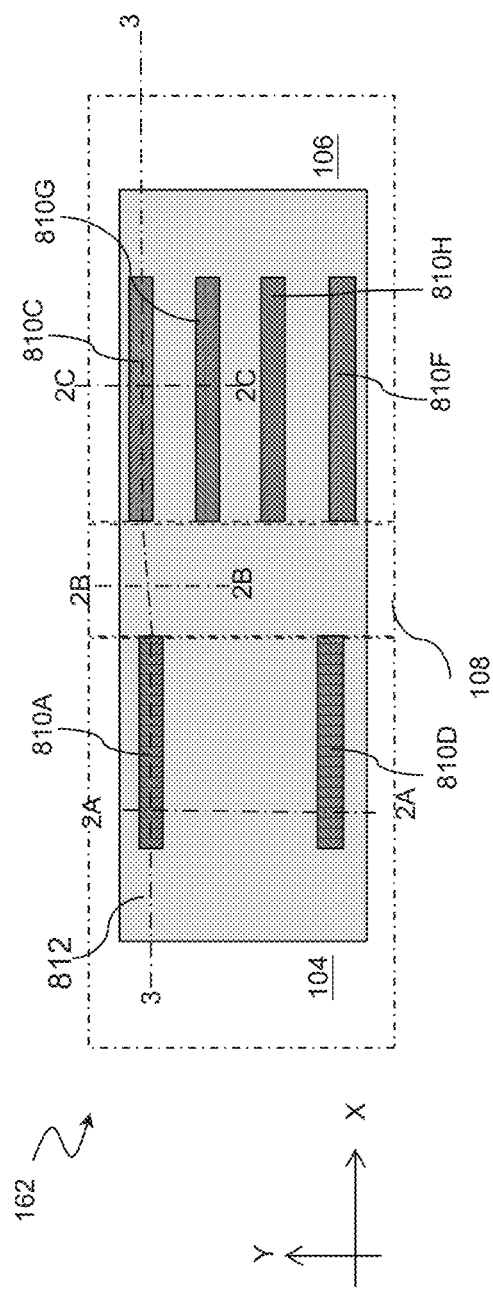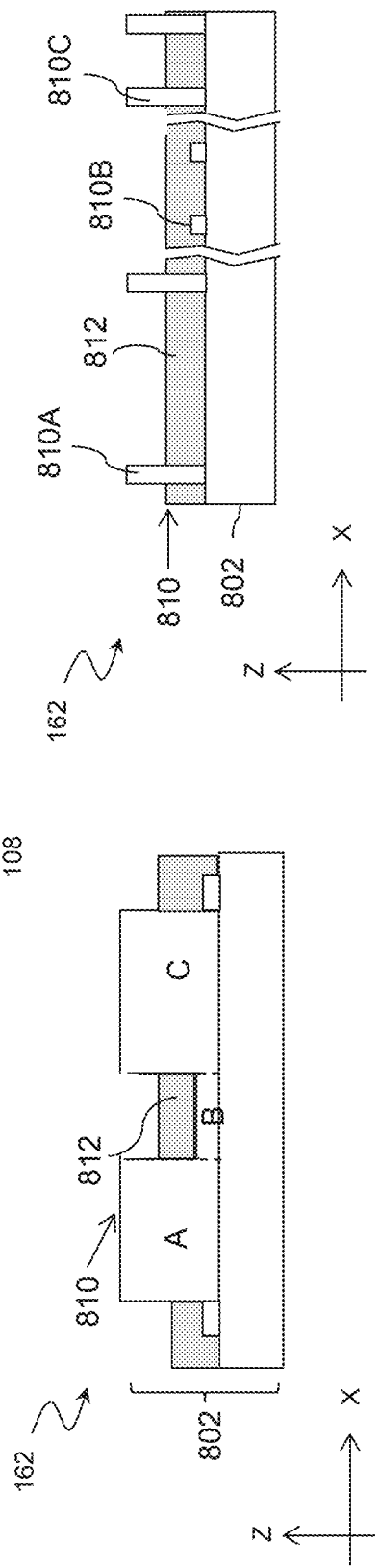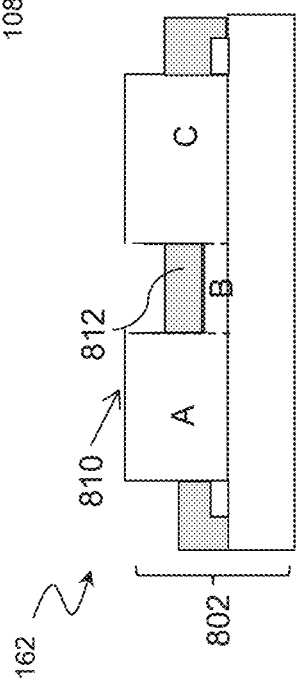

METHOD AND STRUCTURE FOR MANDREL AND SPACER PATTERNING

PRIORITY

This is a continuation of U.S. patent application Ser. No. 16/725,082, filed Dec. 23, 2019, which is a continuation of U.S. patent application Ser. No. 15/945,356, filed Apr. 4, 2018, now issued U.S. Pat. No. 10,521,541, which is a divisional of U.S. patent application Ser. No. 14/801,383, filed Jul. 16, 2015, now issued U.S. Pat. No. 9,946,827, herein incorporated by reference in its entirety.

BACKGROUND

As integrated circuit (IC) technologies are continually progressing to smaller technology nodes, such as a 32 nm technology node and below, simply scaling down similar designs used at larger nodes often results in inaccurate or poorly shaped device features due to the resolution limit of conventional optical lithography technology. Examples of inaccurate or poorly shaped device features include rounding, pinching, necking, bridging, dishing, erosion, metal line thickness variations, and other characteristics that affect device performance. One approach to improving image printing quality on a wafer is to use restrictive design rules (RDR) in IC layout designs. An exemplary IC layout according to RDR includes parallel line patterns extending in the same direction and spaced by a pattern pitch. The line width and pattern pitch are designed so as to improve image printing quality by utilizing constructive light interference.

However, in a large scale IC, not all patterns are designed according to the same design rules. For example, an IC may include both logic circuits and embedded static random-access memory (SRAM) cells. The SRAM cells may use smaller pitches for area reduction, while the logic circuits may use larger pitches. For another example, an IC may include multiple off-the-shelf macros, each of which has been laid out according to its own set of RDRs. In such ICs, multiple layout blocks may be used. Each layout block is designed according to a set of RDRs and different layout blocks may use different RDRs. A space is provided between any two layout blocks to accommodate printing inaccuracy such as line end rounding, as well as to meet certain spacing requirements for IC manufacturing. This space becomes a concern when greater device integration is desired.

BRIEF DESCRIPTION OF THE DRAWINGS

Aspects of the present disclosure are best understood from the following detailed description when they are read with the accompanying figures. It is noted that, in accordance with the standard practice in the industry, various features are not drawn to scale. In fact, the dimensions of the various features may be arbitrarily increased or reduced for clarity of discussion.

FIGS. 6A, 6B, 6C, 6D, and 6E illustrate an IC design layout modified according to the method shown in FIG. 3, in accordance with an embodiment.

FIGS. 8, 9A, 9B, 9C, 10A, 10B, 10C, 11A, 11B, 11C, 12A, 12B, 12C, 13A, 13B, 13C, 14A, 14B, and 14C illustrate top view and/or cross-sectional views of an IC in various manufacturing steps of the method in FIG. 7, in accordance with some embodiment.

DETAILED DESCRIPTION

Figure 1:
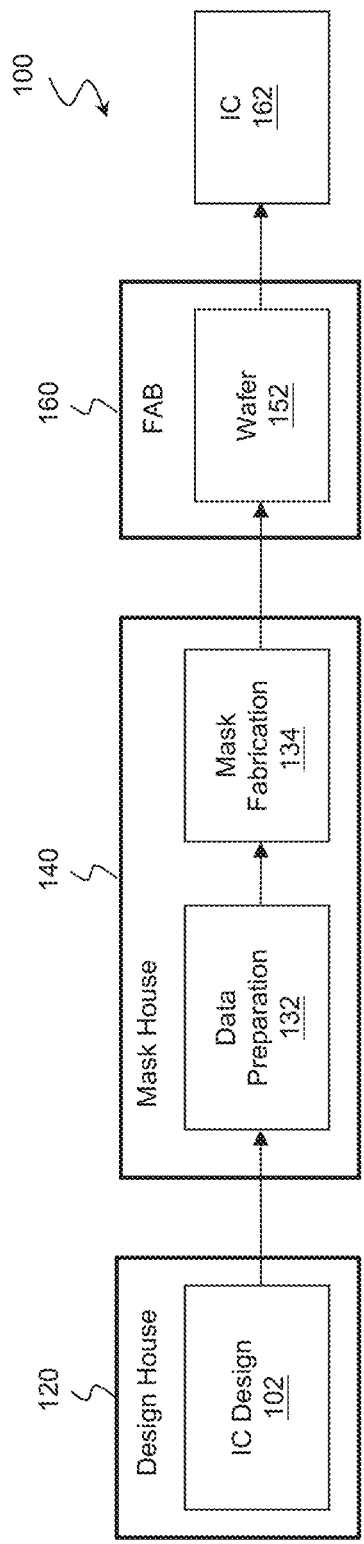
FIG. 1 is a simplified block diagram of an embodiment of an integrated circuit (IC) manufacturing system and an associated IC manufacturing flow.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a simplified block diagram of an embodiment of an IC manufacturing system 100 and an IC manufacturing flow associated therewith, which may benefit from various aspects of the provided subject matter. The IC manufacturing system 100 includes a plurality of entities, such as a design house 120, a mask house 140, and an IC manufacturer 160 (i.e., a fab), that interact with one another in the design, development, and manufacturing cycles and/or services related to manufacturing an IC device 162. The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 120, mask house 140, and IC manufacturer 160 may be owned by a single larger company, and may even coexist in a common facility and use common resources.

Figure 4:
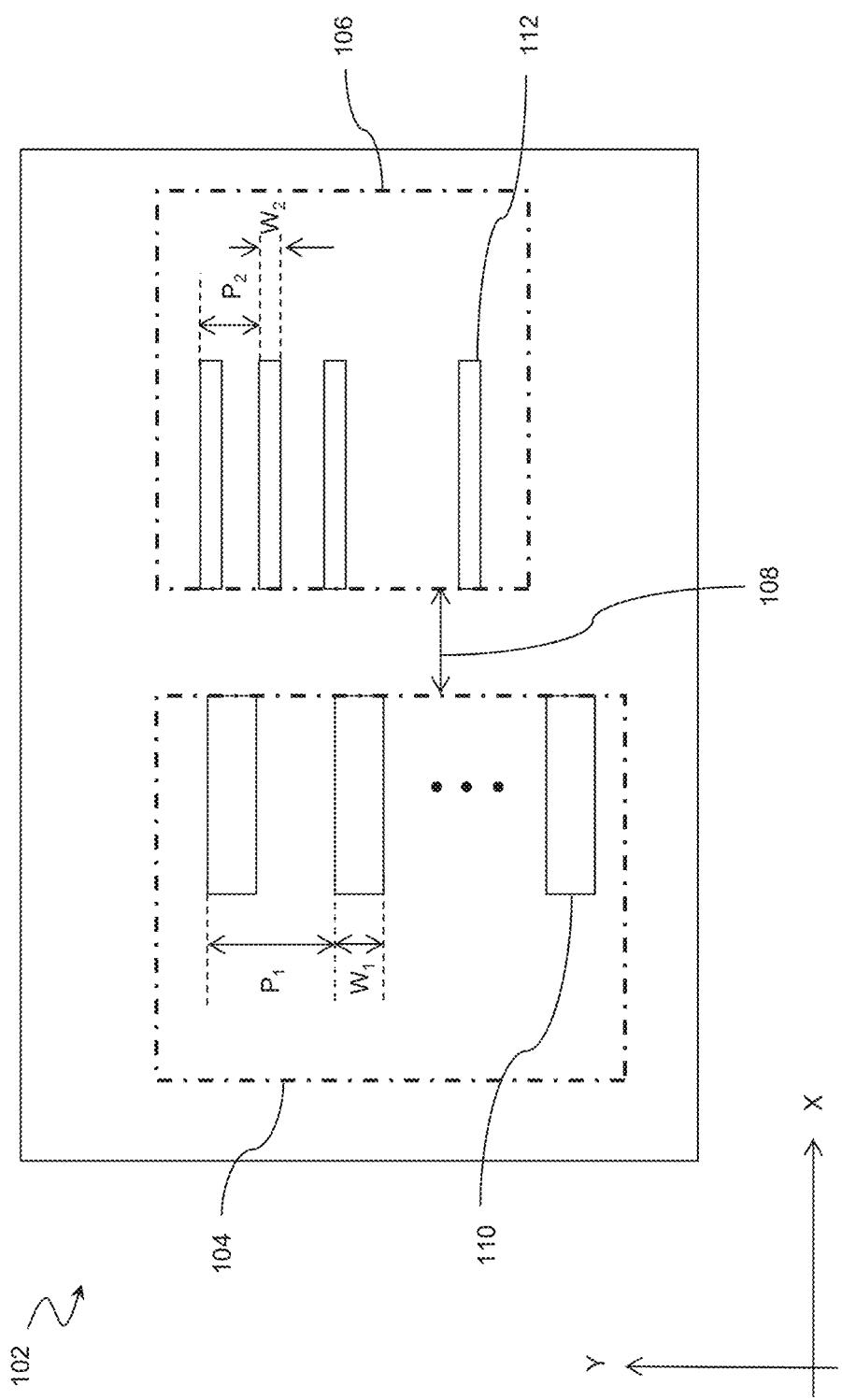
FIGS. 4 and 5 illustrate an IC having two layout blocks in accordance with some embodiments.

The design house (or design team) 120 generates an IC design layout 102. The IC design layout 102 includes various geometrical patterns designed for the IC device 162. An exemplary IC design layout 102 is shown in FIG. 4, which includes two layout blocks 104 and 106 separated by a space 108. The two layout blocks 104 and 106 each include a plurality of patterns 110 and 112 respectively, designed according to some RDRs. Particularly, the patterns 110 and 112 are line patterns oriented lengthwise along the X direction. The line patterns 110 each have a line width W1 and are spaced by an edge-to-edge pitch $P_1$ along the Y direction that is orthogonal to the X direction. The line patterns 112 each have a line width $W_2$ and are spaced by an edge-to-edge pitch $P_2$ along the Y direction. The various geometrical patterns in the IC design layout 102, such as the line patterns 110 and 112, may correspond to patterns of metal, oxide, or semiconductor layers that make up various components of the IC device 162 to be fabricated. The various components may include active regions, gate electrodes, metal lines or vias of an interlayer interconnection, and openings for bonding pads, which are to be formed in a semiconductor substrate (such as a silicon wafer) and various material layers disposed on the semiconductor substrate. In an embodiment, the line patterns 110 and 112 are mandrel patterns used in a mandrel-spacer double patterning process for improving pattern density, which will be described in more details later. The design house 120 implements a proper design procedure to form the IC design layout 102. The design procedure may include logic design, physical design, and/or place and route. The IC design layout 102 is presented in one or more data files having information of the geometrical patterns. For example, the IC design layout 102 can be expressed in a GDSII file format, a DFII file format, or another suitable computer-readable data format.

The mask house 140 uses the IC design layout 102 to manufacture one or more masks to be used for fabricating various layers of the IC device 162. The mask house 140 performs mask data preparation 132, mask fabrication 144, and other suitable tasks. The mask data preparation 132 translates the IC design layout 102 into a form that can be physically written by a mask writer. The mask fabrication 144 then fabricates a plurality of masks that are used for patterning a substrate (e.g., a wafer). In the present embodiment, the mask data preparation 132 and mask fabrication 144 are illustrated as separate elements. However, the mask data preparation 132 and mask fabrication 144 can be collectively referred to as mask data preparation.

In the present embodiment, the mask data preparation 132 includes a dummy mandrel insertion operation, which inserts dummy line patterns in the space 108 (FIG. 4) so as to improve pattern density and to reduce the area needed by the space 108. This will be described in details later. Further in the present embodiment, the mask data preparation 132 prepares a mandrel pattern layout and a cut pattern layout to be used in a spacer double patterning process. The mandrel pattern layout defines a mandrel pattern in a first exposure and the cut pattern layout defines a cut pattern in a second exposure. The cut pattern removes unwanted portions of the mandrel pattern, a derivative, or both. The final pattern includes the mandrel pattern plus the derivative but not the cut pattern.

The mask data preparation 132 may further include optical proximity correction (OPC) which uses lithography enhancement techniques to compensate for image errors, such as those that can arise from diffraction, interference, or other process effects. The mask data preparation 132 may further include a mask rule checker (MRC) that checks the IC design layout with a set of mask creation rules which may contain certain geometric and connectivity restrictions to ensure sufficient margins, to account for variability in semiconductor manufacturing processes, etc. The mask data preparation 132 may further include lithography process checking (LPC) that simulates processing that will be implemented by the IC manufacturer 160 to fabricate the IC device 162. The processing parameters may include parameters associated with various processes of the IC manufacturing cycle, parameters associated with tools used for manufacturing the IC, and/or other aspects of the manufacturing process.

It should be understood that the above description of the mask data preparation 132 has been simplified for the purposes of clarity, and data preparation may include additional features such as a logic operation (LOP) to modify the IC design layout according to manufacturing rules. Additionally, the processes applied to the IC design layout 102 during data preparation 132 may be executed in a variety of different orders.

After mask data preparation 132 and during mask fabrication 144, a mask or a group of masks are fabricated based on the modified IC design layout. For example, an electron-beam (e-beam) or a mechanism of multiple e-beams is used to form a pattern on a mask (photomask or reticle) based on the modified IC design layout. The mask can be formed in various technologies such as a transmissive mask or a reflective mask. In an embodiment, the mask is formed using binary technology, where a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM.

The IC manufacturer 160, such as a semiconductor foundry, uses the mask (or masks) fabricated by the mask house 140 to fabricate the IC device 162. The IC manufacturer 160 is an IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer 152 is fabricated using the mask (or masks) to form the IC device 162. The semiconductor wafer 152 includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, and/or other suitable processes.

Figure 2:
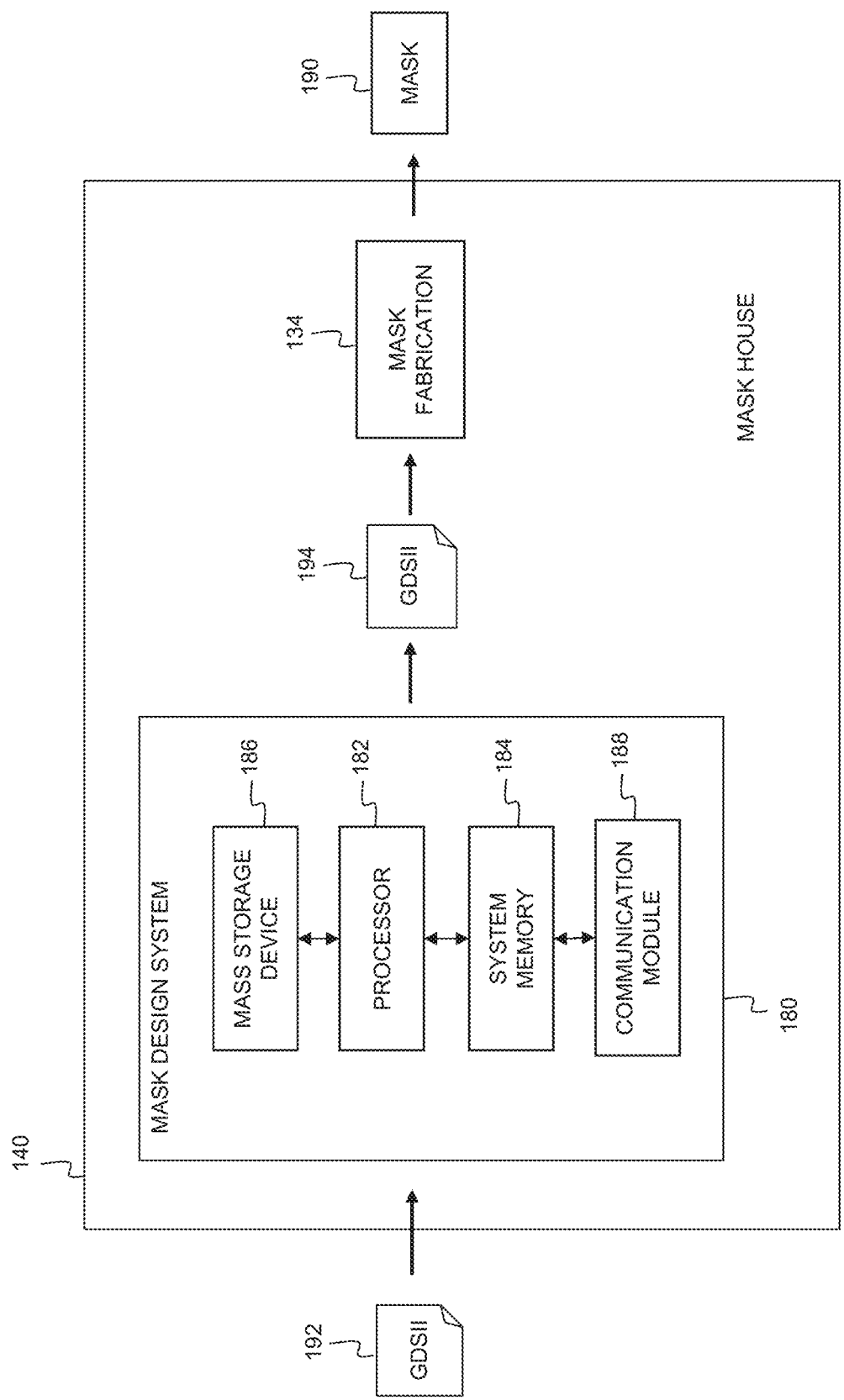
FIG. 2 is a more detailed block diagram of the mask house shown in FIG. 1 according to various aspects of the present disclosure.

FIG. 2 is a more detailed block diagram of the mask house 140 shown in FIG. 1 according to various aspects of the present disclosure. In the illustrated embodiment, the mask house 140 includes a mask design system 180 that is tailored to perform the functionality described in association with mask data preparation 132 of FIG. 1. The mask design system 180 is an information handling system such as a computer, server, workstation, or other suitable device. The system 180 includes a processor 182 that is communicatively coupled to a system memory 184, a mass storage device 186, and a communication module 188. The system memory 184 provides the processor 182 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 186. Examples of mass storage devices may include hard drives, optical drives, magneto-optical drives, solid-state storage devices, and/or a variety other mass storage devices known in the art. The communication module 188 is operable to communicate information such as IC design layout files with the other components in the IC manufacturing system 100, such as the design house 120. Examples of communication modules may include Ethernet cards, 802.11 WiFi devices, cellular data radios, and/or other suitable devices.

In operation, the mask design system 180 is configured to manipulate the IC design layout 102 before it is transferred to a mask 190 by the mask fabrication 134. In an embodiment, the mask data preparation 132 is implemented as software instructions executing on the mask design system 180. To further this embodiment, the mask design system 180 receives a first GDSII file 192 containing the IC design layout 102 from the design house 120, and modifies the IC design layout 102, for example, to insert dummy patterns and to perform other manufacturability enhancement. After the mask data preparation 132 is complete, the mask design system 180 transmits a second GDSII file 194 containing a modified IC design layout to the mask fabrication 134. In alternative embodiments, the IC design layout may be transmitted between the components in IC manufacturing system 100 in alternate file formats such as DFII, CIF, OASIS, or any other suitable file type. Further, the mask design system 180 and the mask house 140 may include additional and/or different components in alternative embodiments.

Figure 3:
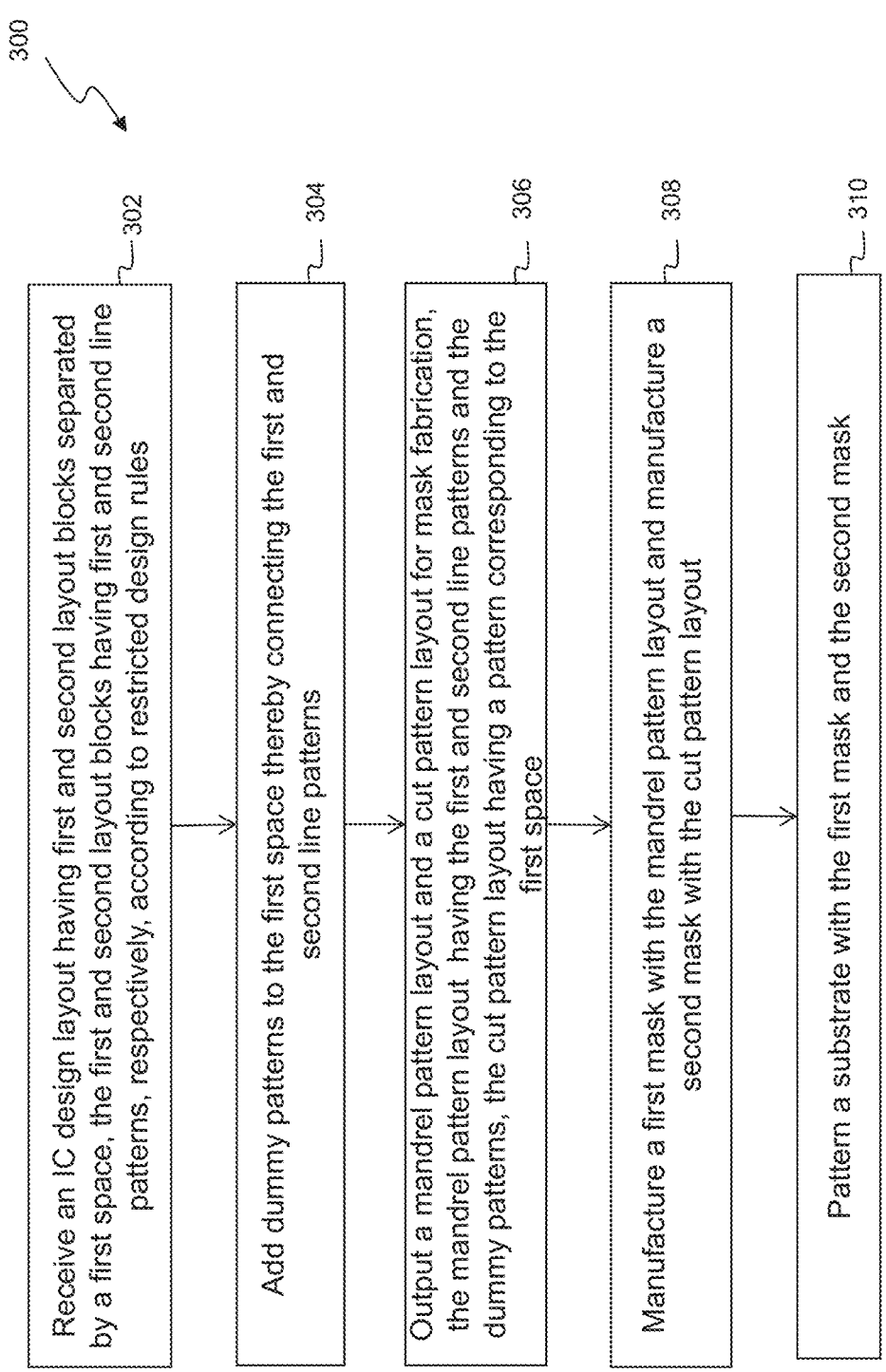
FIG. 3 shows a high-level flowchart of a method of manufacturing an IC according to various aspects of the present disclosure.

FIG. 3 is a high-level flowchart of a method 300 of manufacturing an IC according to various aspects of the present disclosure. In a brief overview, the method 300 includes operations 302, 304, 306, 308, and 310. The operation 302 receives an IC design layout having multiple layout blocks separated by spaces. The operation 304 modifies the IC design layout by inserting dummy patterns to the spaces. The operation 306 outputs a mandrel pattern layout and a cut pattern layout for mask fabrication. The operation 308 fabricates a first mask with the mandrel pattern layout and a second mask with the cut pattern layout. The operation 310 patterns a substrate with the first mask and the second mask, for example, using a spacer patterning technique. The method 300 may be implemented in the various components of the IC manufacturing system 100. For example, the operations 302, 304, and 306 may be implemented in the mask data preparation 132 of the mask house 140; the operation 308 may be implemented in the mask fabrication 134 of the mask house 140; and the operation 310 may be implemented in the IC manufacturer 160. The method 300 is merely an example for illustrating various aspects of the provided subject matter. Additional operations can be provided before, during, and after the method 300, and some operations described can be replaced, eliminated, or moved around for additional embodiments of the method. The method 300 in FIG. 3 is a high-level overview and details associated with each operation therein will be described in association with the subsequent figures in the present disclosure.

At operation 302, the method 300 (FIG. 3) receives the IC design layout 102 as shown in FIG. 4. Referring to FIG. 4, the IC design layout 102 includes various geometrical patterns for creating features of an IC. In the present embodiment, the IC design layout 102 includes the two layout blocks 104 and 106. Each of the layout blocks 104 and 106 is a rectangular region and includes patterns conforming to some restricted design rules. Particularly, the layout block 104 includes the line patterns 110 having the line width $W_1$ and the pattern pitch $P_1$, and the layout block 106 includes the line patterns 112 having the line width $W_2$ and the pattern pitch $P_2$. The pattern pitches $P_1$ and $P_2$ are defined using edge-to-edge distance in the present embodiment. They may also be defined using center-line-to-center-line distance in alternative embodiments. The line patterns 110 and 112 are oriented lengthwise along the same direction (along the X direction), but the line widths $W_1$ and $W_2$ may be the same or different, and the pattern pitches $P_1$ and $P_2$ may be the same or different. In the present example, $P_1$ is greater than $P_2$ and $W_1$ is greater than $W_2$. The layout blocks 104 and 106 are separate for various reasons. For example, they may include different design macros or different types of circuit elements (e.g., logic circuits and SRAM cells). For another example, they may be designed to have different line widths and pitches so as to avoid accidental linking between the two blocks. Further, the layout blocks 104 and 106 are shown in rectangular regions for the purpose of simplification and they may be in other shapes or other polygons in various embodiments.

In embodiments, the line patterns 110 and 112 may be used for creating IC features such as active regions, source and drain features, gate electrodes, metal lines or vias, and openings for bonding pads. In the present embodiment, the line patterns 110 and 112 define mandrel patterns, upon whose sidewalls a spacer will be formed and the spacer will be used for etching a substrate to form fins for fin field effect transistors (FinFETs). This will be described in greater details later.

Figure 5:
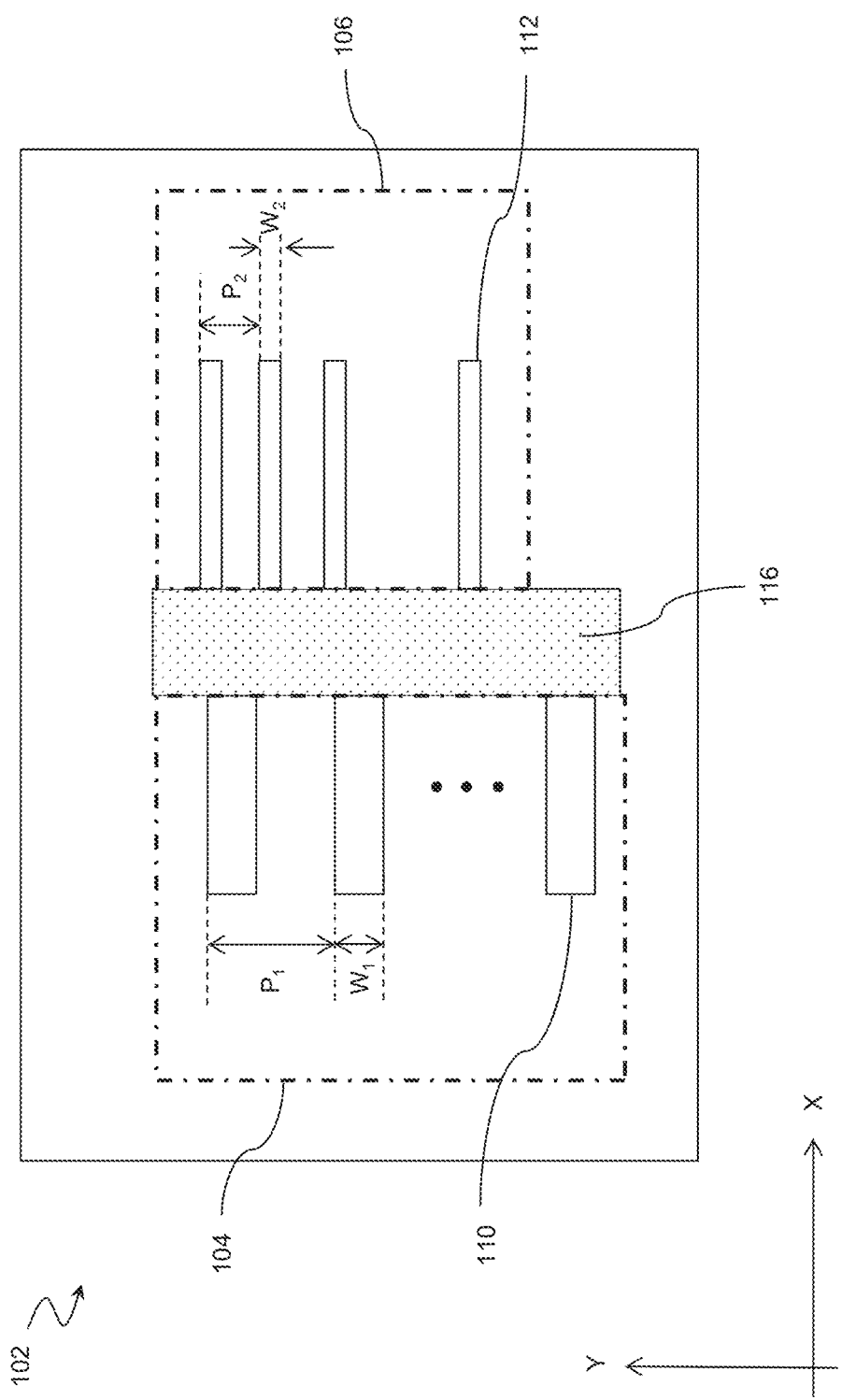

The layout blocks 104 and 106 are separated by the space 108. In the present embodiment, the space 108 is also of a rectangular shape for simplification purposes. Further, in the present embodiment, the space 108 corresponds to a cut pattern 116, as shown in FIG. 5. The cut pattern 116 is used for removing features from a substrate. In a typical design, the space 108 is needed for meeting various manufacturing rules. For example, a manufacturing rule may set a minimum distance between one line end to another line end, such as between the ends of the line patterns 110 and the adjacent ends of the line patterns 112. If the IC design layout 102 violates the manufacturing rule, a design rule checker (DRC) will flag a warning or an error so that the IC design layout may be modified or corrected before proceeding to the next fabrication stage (e.g., the mask fabrication 134 of FIG. 1). For another example, when mandrel lines are formed on a substrate according to the line patterns 110 and 112 and spacers are formed on the sidewalls of the mandrel lines, a manufacturing rule may require that the spacers in the two separate layout blocks 104 and 106 do not come into contact with each other. For yet another example, due to the limitations of the conventional optical lithography technology, the ends of the line patterns 110 and 112 may become rounded after being printed on a wafer and the rounded ends may extend into the space 108. A manufacturing rule may therefore require enough spacing between the line ends to account for the lithography inaccuracy.

Due to the various concerns and other factors, the space 108 and the corresponding cut pattern 116 may be necessary for meeting manufacturability requirements in some instances. However, they typically take up large areas on a wafer. In one example, the width of the cut pattern 116 (along the X direction) is about 200 nanometers (nm) to about 300 nm in a 16 nm process node. This constitutes an added cost for the final IC devices 162. Therefore, it is desirable to reduce the space 108 thereby improving design density and reducing manufacturing costs. The provided subject matter addresses this issue, among others.

Figure 6A:
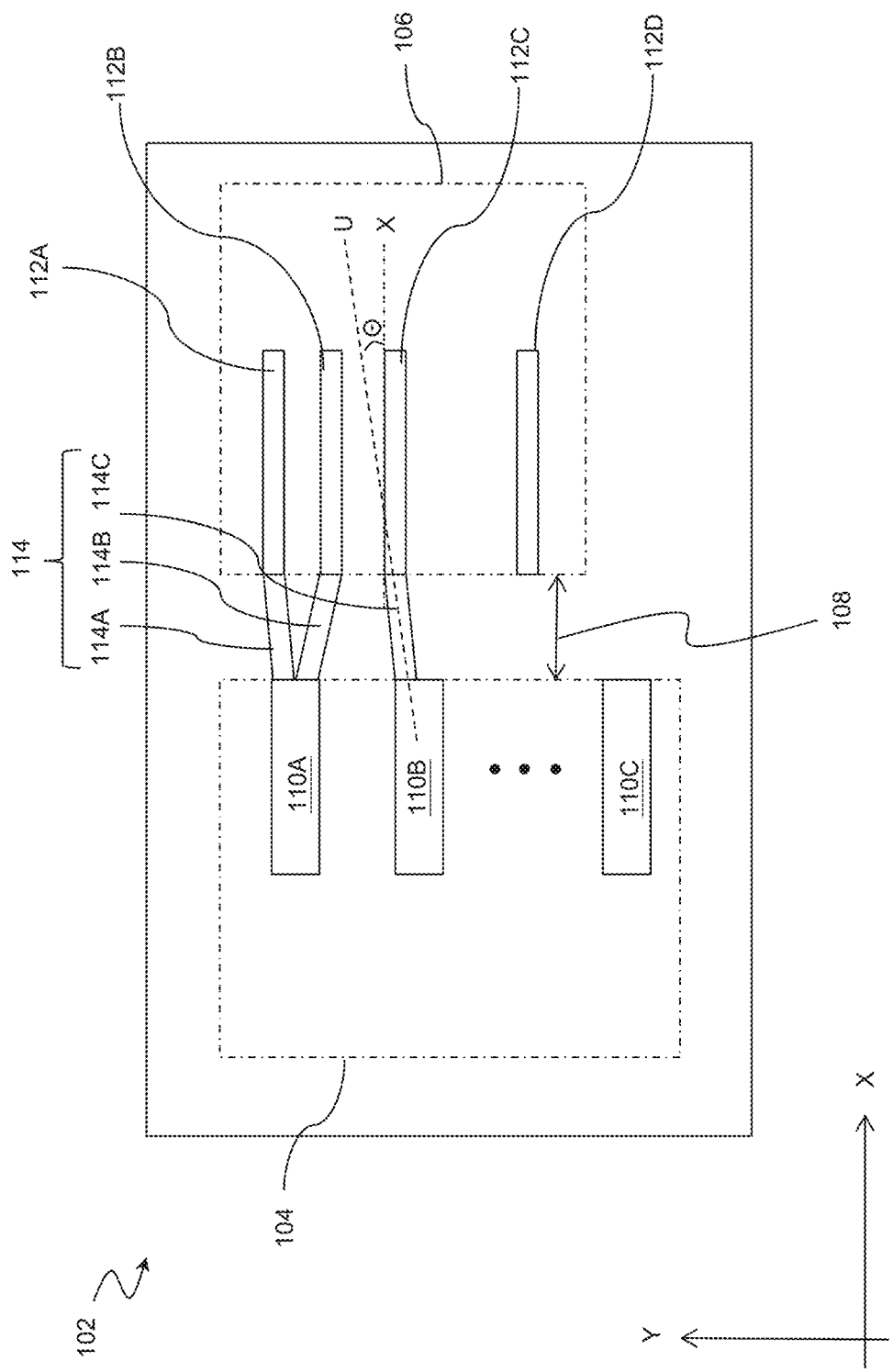

At operation 304, the method 300 (FIG. 3) adds dummy mandrel patterns to the space 108 thereby connecting some of the line patterns 110 and some of the line patterns 112. Referring to FIG. 6A, shown therein is the IC design layout 102 with three dummy mandrel patterns 114A-C inserted. Note that the number of the dummy mandrel patterns 114, as well as their shape, width, and orientation, as shown in FIG. 6A, are only for illustrative purposes and do not limit the provided subject matter. In embodiments, one line pattern 110 may be connected to one or more line patterns 112 by one or more dummy mandrel pattern 114, and vice versa. In addition, not all line patterns 110 and 112 are connected by a dummy mandrel pattern. In the particular example shown in FIG. 6A, line pattern 110A is connected to two line patterns 112A and 112B through two dummy mandrel patterns 114A and 114B respectively; line pattern 110B is connected to line pattern 112C through dummy mandrel pattern 114C; and line patterns 110C and 112D are not connected by any dummy mandrel patterns. Further in the present embodiment, the dummy mandrel patterns 114A-C are linear pieces having about the same width as the line patterns 112, and are each oriented lengthwise along a direction that may be the same as or different from the X direction. For example, the dummy mandrel pattern 114C is oriented lengthwise in a direction U that forms an intersecting angle θ with the direction X. In an embodiment, the angle θ is limited to 45 degrees or less, such as 30 degrees or less, for manufacturability concerns. In another embodiment, the angle θ may be limited to another range of values depending on the manufacturing process.

The purposes and benefits of inserting the dummy mandrel patterns 114 are many folds and the following are not intended to be limiting. First, after connecting line patterns between two adjacent layout blocks, there is no longer a concern for violating rules about minimum gap between line ends for the connected line patterns within the space 108. Second, there is no longer a concern for line end rounding issues for the connected line patterns within the space 108. Third, when spacers are later formed in the layout blocks 104 and 106, there is no long a concern for keeping the spacers separate in the space 108 because the connected line patterns (e.g., line patterns 110B and 112C) have become a continuous piece. These three aspects help reduce the size of the space 108. In another word, the layout blocks 104 and 106 may be placed closer to each other than in conventional design flow without violating manufacturing rules. In one example, the width of the cut pattern 116 (FIG. 5) may be reduced to about 100 nm or less in a 16 nm process node with the insertion of dummy mandrel patterns as provided in the present disclosure.

There are additional benefits. For example, with the addition of the dummy mandrel patterns, spacer pattern density increases in the space 108. This helps improve the shape and critical dimension of fins that are etched with the spacer. For example, the dummy mandrel patterns increase pattern density of the IC 102 and improve chemical mechanical planarization (CMP) loading effect during IC fabrication.

In embodiments, a user may define criteria for where to insert the dummy mandrel patterns 114 and what shape, size, and orientation each dummy mandrel pattern 114 may take. FIGS. 6B-6E illustrate some non-limiting examples. Referring to FIG. 6B, a line pattern 110 is connected to three line patterns 112 by three dummy mandrel patterns 114A, 114B, and 114C. The three dummy mandrel patterns are linear pieces that are oriented lengthwise along different directions. Particularly, the dummy mandrel pattern 114B is oriented lengthwise along the X direction, the dummy mandrel pattern 114A is oriented lengthwise along a direction U1 that is different from the X direction, and the dummy mandrel pattern 114C is oriented lengthwise along a direction U2 that is different from both the U1 and the X directions. Referring to FIG. 6C, the line pattern 110 is connected to two line patterns 112A and 112C that are not adjacent. In some instances, line end rounding of a narrow mandrel (such as the line pattern 112B) may be well controlled and therefore it is not necessary to connect every narrow mandrel using dummy mandrel patterns. Referring to FIG. 6D, the dummy mandrel pattern 114 shown therein is not a linear piece. Instead, it has three linear sections, 114-1, 114-2, and 114-3. For example, section 114-1 may be made by extending the line pattern 110 into the space 108, section 114-3 may be made by extending the line pattern 112 into the space 108, and section 114-2 connects the sections 114-1 and 114-3. The lengths of the sections 114-1 and 114-3 may be adjusted so that the section 114-2 is oriented lengthwise in a particular direction. This may be advantageous in providing more uniform patterns in the IC design layout 102. Various other embodiments of the dummy mandrel patterns are within the scope of the present disclosure. The IC design layout 102 in FIG. 6E is similar to that in FIG. 6D.

At operation 306, the method 300 (FIG. 3) outputs layout data for mask fabrication. In an embodiment, the layout data includes a mandrel pattern layout and a cut pattern layout. In the present embodiment, the mandrel pattern layout includes the line patterns received in operation 302 as well as the dummy mandrel patterns inserted in operation 304; and the cut pattern layout includes one or more patterns corresponding to the space between layout blocks. One example of the mandrel pattern layout and the cut pattern layout is shown in FIG. 6E. Referring to FIG. 6E, the mandrel pattern layout for the IC design 102 includes the line pattern(s) 110 in the layout block 104, the line pattern(s) 112 in the layout block 106, and the dummy mandrel pattern(s) 114A and 114B inserted in the space 108. The cut pattern layout for the IC design 102 includes a cut pattern 116 corresponding to the space 108. In the present embodiment, the cut pattern layout of the IC design 102 further includes one or more cut patterns 118 which will remove spacers formed at the ends of the line patterns 110 and 112. Further, each of the mandrel pattern layout and the cut pattern layout may also include certain assist features, such as those features for imaging effect, processing enhancement, and/or mask identification information. In embodiments, operation 306 outputs the mandrel pattern layout and the cut pattern layout in a computer-readable format for subsequent fabrication stage. For example, the layouts may be outputted in GDSII, DFII, CIF, OASIS, or any other suitable file format.

At operation 308, the method 300 (FIG. 3) manufactures a first mask with the mandrel pattern layout and manufactures a second mask with the cut pattern layout. Operation 308 may manufacture other masks for various layers and features of the IC 162. In embodiments, the first mask and the second mask may be transmissive masks (e.g., for DUV lithography) or reflective masks (e.g., for EUV lithography), and may include imaging enhancement features such as phase shifting. In embodiments where maskless lithography, such as e-beam direct writing, is used, operation 308 is bypassed or involves data preparation for the particular direct writer without fabricating an actual mask.

Figure 7:
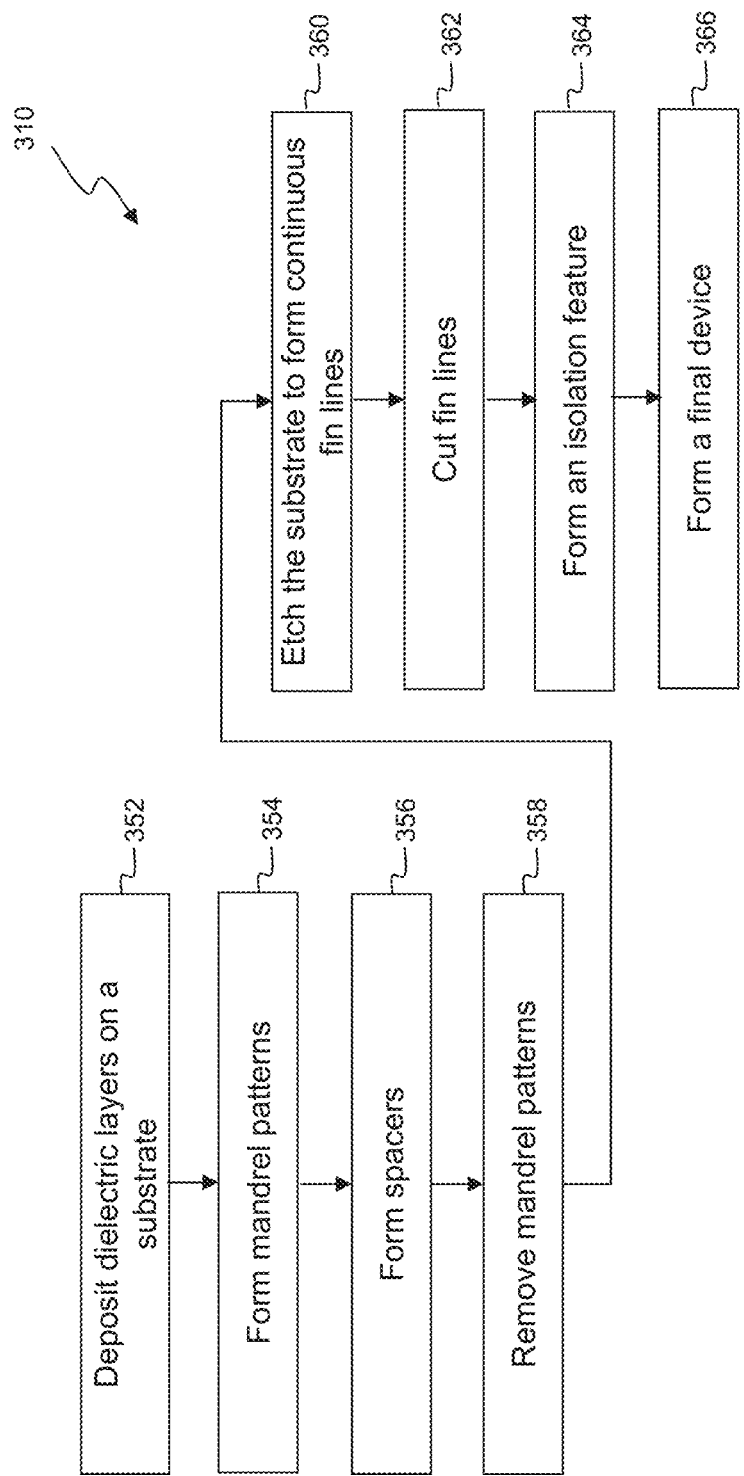
FIG. 7 illustrates a flowchart of a method of patterning a substrate according to various aspects of the present disclosure.

At operation 310, the method 300 (FIG. 3) patterns a substrate (such as a wafer) with the first mask and the second mask to fabricate the final IC device 162. The operation 310 involves a variety of lithography patterning and etching steps. An embodiment of the operation 310 (also referred to as the method 310) is illustrated in FIG. 7, which uses a spacer technique in forming FinFETs. In various embodiments, operation 310 may pattern a substrate with or without using a spacer technique. The method 310 is merely an example for illustrating various aspects of the provided subject matter. Additional operations can be provided before, during, and after the method 310, and some operations described can be replaced, eliminated, or moved around for additional embodiments of the method. The various operations in FIG. 7 are discussed below in conjunction with FIGS. 8-14C.

Figure 8:
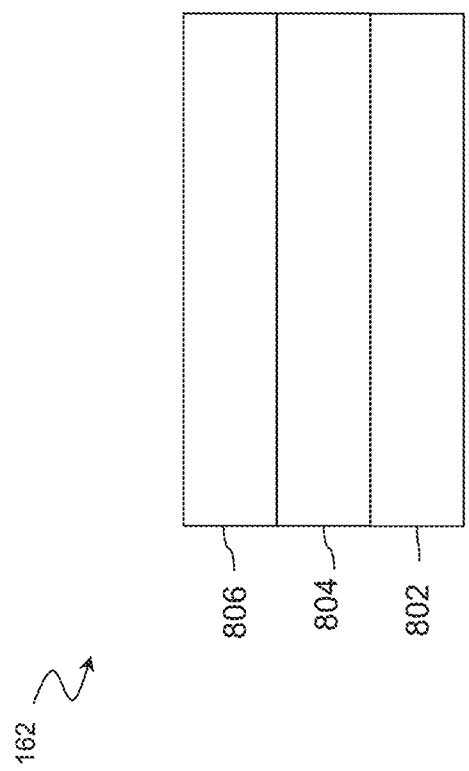

At operation 352, the method 310 (FIG. 7) deposits dielectric layers 804 and 806 over a substrate 802 (e.g., a semiconductor wafer) as shown in FIG. 8. The substrate 802 includes silicon in the present embodiment. In various embodiments, the substrate 802 may include another elementary semiconductor, such as germanium; a compound semiconductor, such as silicon carbide, indium arsenide, or indium phosphide; or an alloy semiconductor, such as silicon germanium carbide, gallium arsenic phosphide, or gallium indium phosphide. Materials suitable for the dielectric layers 804 and 806 include, but not limited to, silicon oxide, silicon nitride, poly-silicon, $Si_3N_4$, SiON, TEOS, nitrogen-containing oxide, nitride oxide, high-k materials, or combinations thereof. The dielectric layers 804 and 806 are each formed by one or more deposition techniques, such as thermal oxidation, chemical vapor deposition (CVD), and physical vapor deposition (PVD).

At operation 354, the method 310 (FIG. 7) forms mandrel patterns in the dielectric layer 806. Refer to FIGS. 9A, 9B, and 9C collectively, which illustrate a portion of the IC device 162. Particularly, FIG. 9A shows a top view of the device 162 which includes a first region corresponding to the layout block 104 (FIG. 6E) and a second region corresponding to the layout block 106 (FIG. 6E). The device 162 further includes a third region sandwiched between the first and second regions. The third region corresponds to the space 108 of FIG. 6E. For the convenience of discussion, the first region is also referred to as the region 104, the second region is also referred to as the region 106, and the third region is also referred to as the region 108.

The device 162 is patterned to have a mandrel pattern 806' (a patterned dielectric layer 806). The mandrel pattern 806' includes multiple sections 806A-E connected together: section 806A corresponds to the line pattern 110A in the layout block 104 (FIG. 6E), sections 806B and 806D correspond to the dummy mandrel patterns 114A and 114B (FIG. 6E) respectively, and sections 806C and 806E correspond to the line patterns 112A and 112B (FIG. 6E) respectively. The sections 806A, 806C, and 806E are oriented lengthwise along the X direction, while the sections 806B and 806D are each oriented lengthwise along a respective direction different from the X direction. FIG. 9B is a cross-sectional view of the device 162 along the 1-1 line of FIG. 9A. In the present example, the 1-1 line goes through the center lines of the sections 860B and 806C. Therefore it is not a straight line. FIG. 9C shows cross-sectional views of the device 162 along the 2A-2A, 2B-2B, and 2C-2C lines of FIG. 9A. The mandrel pattern 806' is a protruding feature (also known as a line pattern) in the present embodiment. In an alternative embodiment, the mandrel pattern 806' may be a trench feature.

The mandrel pattern 806' is formed by patterning the dielectric layer 806 with a procedure including a lithography process and an etching process. For example, a photoresist (or resist) layer is formed on the dielectric layer 806 using a spin-coating process and soft baking process. Then, the photoresist layer is exposed to a radiation using the first mask manufactured in the operation 308 (FIG. 3). The exposed photoresist layer is developed using post-exposure baking, developing, and hard baking thereby forming a patterned photoresist layer over the dielectric layer 806. Subsequently, the dielectric layer 806 is etched through the openings of the patterned photoresist layer, forming the mandrel pattern 806'. The etching process may include a dry (or plasma) etching, a wet etching, or other suitable etching methods. The patterned photoresist layer is removed thereafter using a suitable process, such as wet stripping or plasma ashing. During the above photolithography process, the density and regularity of the mandrel patterns (110, 112, and 114) help improve pattern critical dimension uniformity in view of optical proximity effect.

At operation 356, the method 310 (FIG. 7) forms a spacer 808. Refer to FIG. 10A (a top view of the device 162), FIG. 10B (a cross-sectional view of the device 162 along the 1-1 line of FIG. 10A), and FIG. 10C (cross-sectional views of the device 162 along the 2A-2A, 2B-2B, and 2C-2C lines of FIG. 10A). The spacer 808 is formed on sidewalls of the mandrel pattern 806' and completely surrounds the mandrel pattern 806'. In an embodiment, the spacer 808 has a substantially uniform thickness. The spacer 808 includes one or more material different from the mandrel pattern 806'. In an embodiment, the spacer 808 may include a dielectric material, such as titanium nitride, silicon nitride, or titanium oxide. The spacer 808 can be formed by various processes, including a deposition process and an etching process. For example, the deposition process may include a CVD process or a PVD process. For example, the etching process may include an anisotropic etch such as plasma etch. In an embodiment of the method 310, the operation 356 is bypassed and the mandrel pattern 806' is used for etching the substrate without forming the spacer 808.

At operation 358, the method 310 (FIG. 7) removes the mandrel pattern 806' and leaves the spacer 808 standing over the dielectric layer 804. Refer to FIG. 11A (a top view of the device 162), FIG. 11B (a cross-sectional view of the device 162 along the 3-3 line of FIG. 11A), and FIG. 11C (cross-sectional views of the device 162 along the 2A-2A, 2B-2B, and 2C-2C lines of FIG. 11A). The line 3-3 is the line 1-1 shifted from the mandrel pattern 806' to the spacer 808. The spacer 808 remains over the dielectric layer 804 after the mandrel pattern 806' has been removed, e.g., by an etching process selectively tuned to remove the dielectric material 806 but not the spacer material. The etching process can be a wet etching, a dry etching, or a combination thereof.

Figure 12A:
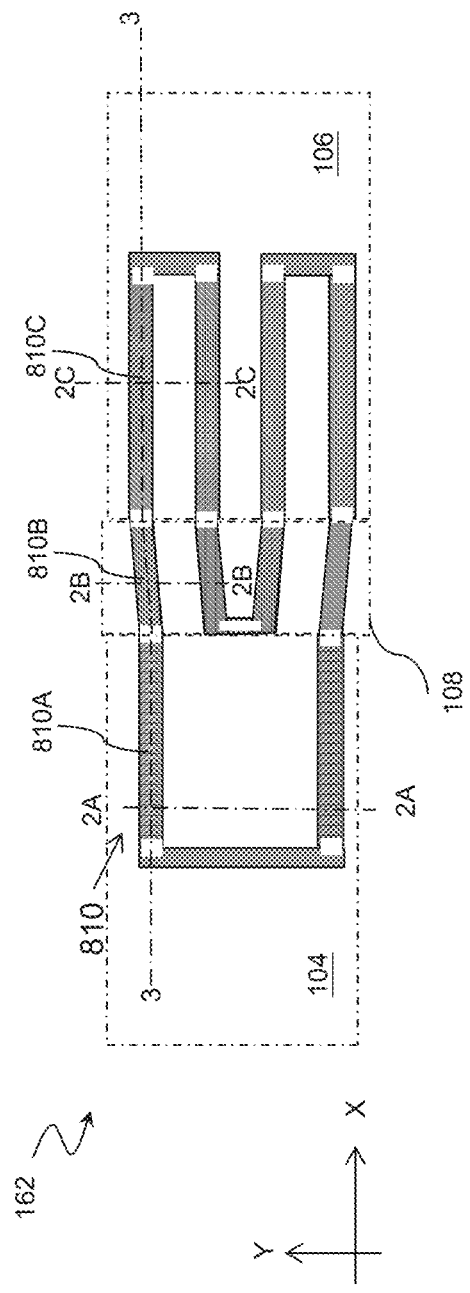
Figure 12C:
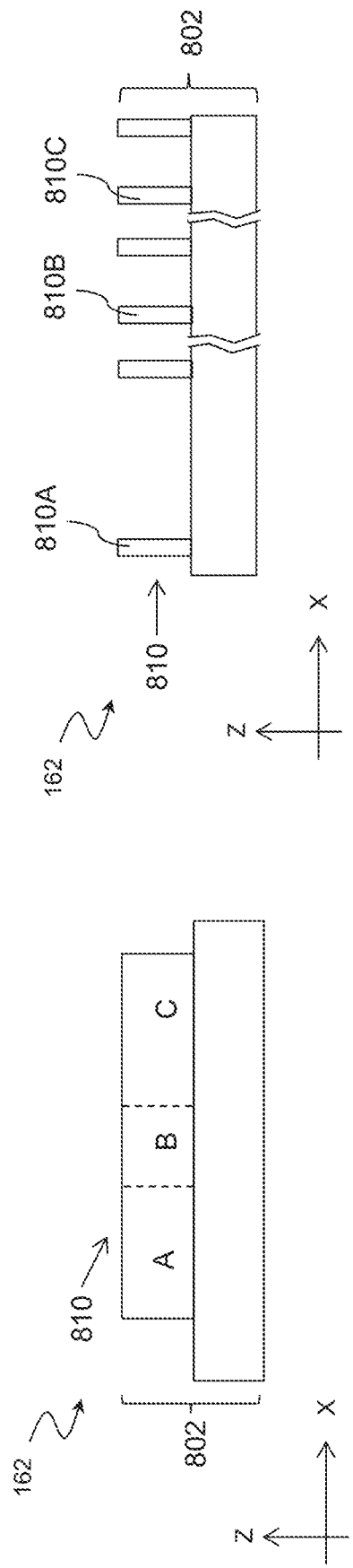
Figure 12B:
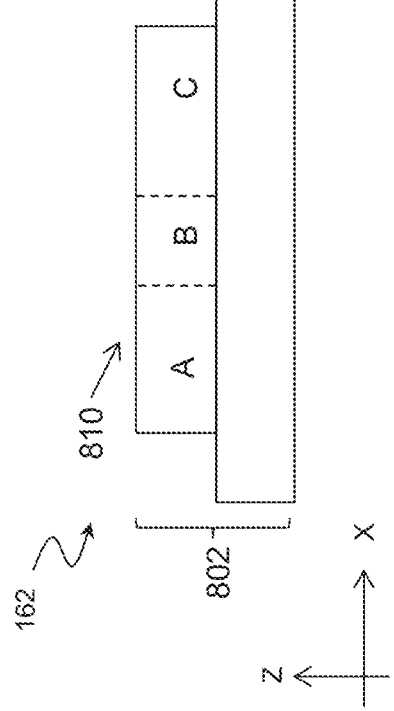

At operation 360, the method 310 (FIG. 7) etches the substrate 802 to form a continuous fin line 810 in the substrate 802. Refer to FIG. 12A (a top view of the device 162), FIG. 12B (a cross-sectional view of the device 162 along the 3-3 line of FIG. 12A), and FIG. 12C (cross-sectional views of the device 162 along the 2A-2A, 2B-2B, and 2C-2C lines of FIG. 12A). The fin line 810 includes multiple sections connected to form a continuous piece. For example, the fin line 810 includes a section 810A in the region 104, a section 810B in the region 108, a section 810C in the region 106, as well as other sections. To form the fin line 810, the substrate 802 is etched with the spacer 808 as an etch mask. The spacer 808 and the dielectric layer 804 are subsequently removed. The etching process can be a wet etching, a dry etching, or a combination thereof.

At operation 362, the method 310 (FIG. 7) performs a fin cut process with the second mask manufactured in the operation 308 (FIG. 3). In the present embodiment, the second mask includes a pattern corresponding to the space 108 such as the pattern 116 of FIG. 6E. The second mask may further include one or more patterns for cutting fin ends, such as the patterns 118 of FIG. 6E, and one or more patterns for removing dummy fins. Refer to FIG. 13A (a top view of the device 162), FIG. 13B (a cross-sectional view of the device 162 along the 3-3 line of FIG. 13A), and FIG. 13C (cross-sectional views of the device 162 along the 2A-2A, 2B-2B, and 2C-2C lines of FIG. 13A). Two fins, 810A and 810D, are formed in the region 104. Four fins, 810C, 810F, 810G, and 810H, are formed in the region 106. The portions of the fin line 810 covered by the cut patterns (cut regions) are substantially removed. However, as shown in FIGS. 13B and 13C, small portions of the fin line 810 in the cut regions may remain because fin etching process typically does not completely etch to the bottom of the fin line 810 to avoid over-etching of the substrate 802. The small residual portions of the fin line 810 are referred to as fin stubs in the following discussion because they are much shorter (along the Z direction) than the regular fins (e.g., 810A). For example, the fin sections 810B and 810E have become fin stubs 810B and 810E after the fin cut process. With reference to FIG. 13A, the fins 810A, 810C, 810D, 810F, 810G, and 810H are oriented lengthwise in the X direction; the fin stub 810B is oriented lengthwise in a first direction different from the X direction; and the fin stub 810E is oriented lengthwise in a second direction different from both the first direction and the X direction. The fin stub 810B connects a bottom portion of the fins 810A and 810C. The fin stub 810E connects a bottom portion of the fins 810D and 810F. There are other fin stubs shown in FIG. 13A, though not labeled. In an embodiment, the operation 362 may also remove dummy fins, i.e. fins that are not used for forming transistors. For example, the second mask may include a cut pattern that removes the fin 810G.

In the present embodiment, the fin cut process includes a lithography process and an etching process. For example, a photoresist layer is formed on the silicon substrate using a spin-coating process and soft baking process. Then, the photoresist layer is exposed to a radiation using the second mask manufactured in the operation 308. The exposed photoresist layer is subsequently developed and stripped thereby forming a patterned photoresist layer. The fin line 810 is partially protected by the patterned photoresist layer. Subsequently, the fin line 810 is etched through the openings of the patterned photoresist layer. The patterned photoresist layer is removed thereafter using a suitable process, such as wet stripping or plasma ashing.

At operation 364, the method 310 (FIG. 7) forms an isolation feature 812 over the substrate 802. Refer to FIG. 14A (a top view of the device 162), FIG. 14B (a cross-sectional view of the device 162 along the 3-3 line of FIG. 14A), and FIG. 14C (cross-sectional views of the device 162 along the 2A-2A, 2B-2B, and 2C-2C lines of FIG. 14A). The isolation feature 812 electrically isolate the various fins, including the fins 810A and 810C. Furthermore, the various fin stubs, including the fin stub 810B, are buried underneath the isolation feature 812. In an embodiment, operation 364 forms the isolation feature 812 by depositing a dielectric material such as silicon oxide over the substrate 802 and then etches back the dielectric material. In the present embodiment, portions of the fins 810 extending above the isolation feature 812 provide source, drain, and channel regions for FinFETs. For example, the fins 810A, 810C, 810D, and 810H partially extend above the isolation feature 812 and each provide source, drain, and channel region for one or more FinFETs.

At operation 366, the method 310 (FIG. 7) performs further processes to complete the fabrication of the final IC device 162. For example, the operation 366 may form source and drain regions in the fins (e.g., 810A and 810C) using ion implantation, epitaxial growth, and/or other suitable methods. For example, the operation 366 may form gate stacks over the fins (e.g., 810A and 810C) using a gate-first process or a gate-last process. Other processes include forming source and drain contacts, forming gate contacts, and forming via and metal interconnects, and so on.

Although not intended to be limiting, the present disclosure provides many benefits to the manufacturing of an IC. For example, by connecting mandrel patterns in different layout blocks with dummy mandrel patterns, embodiments of the present disclosure reduce the space between the different layout blocks. This increases pattern density and reduces material costs per IC device. This also increases pattern density for improving fin uniformity, fin critical dimension, and CMP loading effect during various stages of fin etching processes. Further, embodiments of the present disclosure provide flexible schemes for inserting the dummy mandrel patterns, which may be tuned for specific process needs.

In one exemplary aspect, the present disclosure is directed to a method. The method includes receiving an integrated circuit design layout that includes first and second layout blocks separated by a first space. The first and second layout blocks include, respectively, first and second line patterns oriented lengthwise in a first direction. The method further includes adding a dummy pattern to the first space, which connects the first and second line patterns. The method further includes outputting a mandrel pattern layout and a cut pattern layout in a computer-readable format. The mandrel pattern layout includes the first and second line patterns and the dummy pattern. The cut pattern layout includes a pattern corresponding to the first space. In embodiments, the method further includes manufacturing a first mask with the mandrel pattern layout and manufacturing a second mask with the cut pattern layout.

In embodiments, the method further includes patterning a substrate with the first mask and the second mask. To further this embodiment, the method includes performing a first patterning process to a substrate with the first mask, thereby forming one or more features on the substrate, and performing a second patterning process to the substrate with the second mask, thereby removing a first portion of the one or more features, wherein the first portion lies in a region corresponding to the first space in the IC design layout.

In another exemplary aspect, the present disclosure is directed to a method. The method includes receiving an integrated circuit (IC) design layout. The IC design layout includes a first layout block and a second layout block. The first layout block includes a first plurality of line patterns that are oriented lengthwise in a first direction and spaced from each other with a first pitch along a second direction that is orthogonal to the first direction. The second layout block includes a second plurality of line patterns that are oriented lengthwise in the first direction and spaced from each other with a second pitch along the second direction, and the first and second layout blocks are separated by a first space. The method further includes adding a dummy pattern to the first space, wherein the dummy pattern connects one of the first plurality and one of the second plurality. The method further includes outputting a mandrel pattern layout and a cut pattern layout in a computer-readable format. The mandrel pattern layout includes the first and second pluralities and the dummy pattern. The cut pattern layout includes a pattern corresponding to the first space.

In an embodiment, the method further includes adding another dummy pattern to the first space that connects the one of the first plurality and another one of the second plurality. In a further embodiment, the one of the second plurality is adjacent to the other one of the second plurality.

In some embodiments, the first pitch is different from the second pitch. In some embodiments, each of the first plurality has a first line width, each of the second plurality has a second line width, and the first and second line widths are different.

In another exemplary aspect, the present disclosure is directed to a semiconductor device. The semiconductor device includes a first fin on a substrate, wherein the first fin provides source, drain, and channel regions for a first field effect transistor (FET). The semiconductor device further includes a second fin on the substrate, wherein the second fin provides source, drain, and channel regions for a second FET. The semiconductor device further includes a first fin stub on the substrate, wherein the first fin stub connects a bottom portion of the first fin and a bottom portion of the second fin. The semiconductor device further includes an isolation feature over the first fin stub and between the first and second fins. From a top view, the first and second fins are oriented lengthwise in a first direction, and the first fin stub is oriented lengthwise in a second direction that is different from the first direction. In embodiments, the first fin lies completely in a first rectangular region, the second fin lies completely in a second rectangular region, and the first and second rectangular regions are arranged side by side along the first direction.

In an embodiment, the semiconductor device further includes a third fin, a fourth fin, and a second fin stub. The third fin provides source, drain, and channel regions for a third FET. The fourth fin provides source, drain, and channel regions for a fourth FET. The second fin stub connects a bottom portion of the third fin and a bottom portion of the fourth fin. From a top view, the third and fourth fins are oriented lengthwise in the first direction, and the second fin stub is oriented lengthwise in a third direction that is different from the first and second directions. In a further embodiment, the third fin lies completely in the first rectangular region, and the fourth fin lies completely in the second rectangular region.

The foregoing outlines features of several embodiments so that those having ordinary skill in the art may better understand the aspects of the present disclosure. Those having ordinary skill in the art should appreciate that they may readily use the present disclosure as a basis for designing or modifying other processes and structures for carrying out the same purposes and/or achieving the same advantages of the embodiments introduced herein. Those having ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    forming a first mandrel pattern comprising at least first and second mandrels for a mandrel-spacer double patterning process, wherein each of the first and second mandrels is a straight line pattern oriented lengthwise in a first direction; and
    forming a second mandrel pattern comprising at least a third mandrel inserted between the first and second mandrels, wherein the first mandrel pattern and the second mandrel pattern comprise a same material, a dimension of the third mandrel measured in the first direction is smaller than lengths of the first and second mandrels measured in the first direction, and the first and second mandrels are merged together with the third mandrel to form a single pattern.

2. The method of claim 1, wherein the first mandrel pattern and the second mandrel pattern are in a same layer of a structure.

3. The method of claim 2, wherein the same layer is a dielectric layer disposed above a substrate of the structure.

4. The method of claim 1, further comprising:
    forming spacers on sidewalls of the single pattern;
    removing the single pattern; and
    etching a substrate with the spacers as an etch mask, thereby forming a feature on the substrate.

5. The method of claim 4, further comprising:
    recessing a portion of the feature, wherein the portion lies in a region corresponding to the spacers on the sidewalls of the third mandrel.

6. The method of claim 1, wherein the first and second mandrels have a same dimension.

7. The method of claim 1, wherein the first and third mandrels have different dimensions.

8. The method of claim 1, wherein the third mandrel physically connects with both the first and second mandrels.

9. The method of claim 1, wherein the first and second mandrels orient lengthwise in a first direction, and the third mandrel orients lengthwise in a second direction different from the first direction.

10. The method of claim 9, wherein the first direction intersects the second direction with an angle not more than 45 degrees.

11. A method, comprising:
    forming a first mandrel pattern comprising at least first and second mandrels, wherein the first and second mandrels are straight lines;
    forming a second mandrel pattern comprising at least a third mandrel inserted between the first and second mandrels, wherein the first mandrel pattern and the second mandrel pattern comprise a same material and are provided in a same layer over a substrate, and the first and second mandrels are connected by the third mandrel to form a single pattern, wherein a dimension of the third mandrel measured along a lengthwise direction of the first mandrel is smaller than a length of either of the first and second mandrels;

forming spacers on sidewalls of the single pattern;

removing the single pattern; and etching the substrate with the spacers as an etch mask.

12. The method of claim 11, wherein a first imaginary center line of the first mandrel along a lengthwise direction of the first mandrel is not aligned with a second imaginary center line of the second mandrel along a lengthwise direction of the second mandrel.

13. The method of claim 12, wherein a third imaginary center line of the third mandrel along a lengthwise direction of the third mandrel is not parallel with respect to the first imaginary center line and the second imaginary center line.

14. The method of claim 11, wherein the first and second mandrels have a same width.

15. The method of claim 11, wherein the same layer is a dielectric layer, and the same material is a dielectric material of the dielectric layer.

16. The method of claim 11, wherein the substrate includes a semiconductor layer and a dielectric layer disposed on the semiconductor layer, and wherein the etching of the substrate includes:

transferring a pattern in the spacers to the dielectric layer; and etching the semiconductor layer through openings in the dielectric layer.

17. A method, comprising:

forming a first mandrel pattern over a substrate, the first mandrel pattern comprising at least first and second mandrels in straight line patterns of a same width;

forming a second mandrel pattern over the substrate, the second mandrel pattern comprising at least a third mandrel inserted between the first and second mandrels, wherein the first mandrel pattern and the second mandrel pattern comprise a same material, the third mandrel is in a straight line pattern with a length less than either of the straight line patterns of the first and second mandrels, and the first and second mandrels are connected by the third mandrel to form a continuous pattern;

depositing spacers on sidewalls of the continuous pattern;

removing the continuous pattern; and etching the substrate through openings in the spacers.

18. The method of claim 17, wherein the first mandrel pattern includes a first plurality of mandrels including the first mandrel and a second plurality of mandrels including the second mandrel, wherein the first plurality of mandrels are spaced apart from each other along a first direction, and the second plurality of mandrels are spaced apart from each other along the first direction.

19. The method of claim 18, wherein a first pitch of the first plurality of mandrels is different from a second pitch of the second plurality of mandrels, and wherein each of the first pitch and the second pitch is measured along the first direction.

20. The method of claim 17, wherein the second mandrel pattern comprises a fourth mandrel inserted between the first and second mandrels, wherein the first and second mandrels are connected by each of the third and fourth mandrels to form the continuous pattern.

* * * * *